Jan. 24, 1956  A. E. LE VAN  2,731,825
COMPARATOR FOR TAPERED PIECES
Filed April 2, 1952  2 Sheets-Sheet 1

INVENTOR.
AMBROSE E. LE VAN
BY
ATTORNEY

Jan. 24, 1956          A. E. LE VAN          2,731,825

COMPARATOR FOR TAPERED PIECES

Filed April 2, 1952          2 Sheets-Sheet 2

*INVENTOR.*
AMBROSE E. LE VAN

BY

ATTORNEY

United States Patent Office 2,731,825
Patented Jan. 24, 1956

2,731,825

COMPARATOR FOR TAPERED PIECES

Ambrose E. Le Van, Sellersville, Pa., assignor to American Machine and Metals, Inc., Moline, Ill., a corporation of Delaware Application April 2, 1952, Serial No. 280,095

3 Claims. (Cl. 73—37.5)

The invention relates to a comparator gauging system for tapered pieces.

While comparators for cylindrical pieces need indicate only the variation of one dimension from standard, a comparator for tapered pieces must indicate the variations of at least two dimensions from standard, namely the variations in diameter at points a known distance apart along the axis. Two comparators, each measuring the variation of the diameter of the piece at a different point along the axis of the piece would have to be employed involving the delay of looking at two separate dials.

If we consider the tapered piece as the frustrum of a cone bounded by a conical surface and circular bases normal to the axis of the cone, there is in addition to the diameters of the two bases, a third dimension of great importance—that is the variation of the slope of the tapered surface.

In many cases the accuracy of the taper is of prime importance.

When the limits of the diameter are unimportant but the accuracy of the taper is the thing to be held, we might visually compare the angles through which the pointers on two different gauges move.

These two gauges were hitherto connected to a set of jets, often mounted on a ring, each ring of a size appropriate for the diameter of the specimen at one of two spaced points and the air jets in each ring were fed by air whose pressure was determined by a regulator serving only that set of jets. In order to bring the pointers on the two gauges into parallelism it was necessary to adjust each pressure regulator independently.

In my system there is only one pressure regulator and there is only one pressure gauge assembly, and this permits reading directly by the relative position of the two pointers, the accuracy of the taper and also the variation of the specimen from the master piece.

The invention comprises a single gauge which will give the variations in dimension from those of the master of three dimensions the diameter at one point on the axis of a piece, the diameter at a second point along the axis of the piece, and the taper of the piece between the planes passing through the two points.

One object of the invention is to provide an apparatus which will simultaneously indicate on a single dial variations from standard of two dimensions.

Another object of the invention is to provide an apparatus which will simultaneously indicate on a single dial variations from standard of three different dimensions.

Another object of the invention is to indicate on a single dial the variations from standard of two diameters in a piece.

Another object of the invention is to indicate on a single dial the variations of the taper of a piece independent of the variations in its diameters.

Another object of the invention is to provide an air supply passage, a single restriction in the passage, two branches of the air passage, pressure indicators in each branch, air jets at the end of each branch, and means for varying the distance of one set of air jets from the object to be measured to bring the pointers of the two pressure indicators into parallelism when applied to the master tapered piece.

Another object of the invention is to provide an air supply passage, a single restriction in the passage, two branches of the air passage, an instrument box, a pressure indicator in said instrument box moving a pointer in response to the pressure in one of said branches, a second pressure indicator in said instrument box moving a second pointer carried by a sleeve surrounding the shaft of the first pointer, in response to the pressure in the second branch, air jets at the ends of each passage, and means for varying the distance of one set of air jets from the object to be compared to superimpose the two pointers.

Another object of the invention is to provide a dial carrying a circular scale, a pointer movable to indicate the value of one quantity on said scale, another pointer independently movable on the axis of the first pointer to show the value of a second quantity on said scale, and means carried by one pointer to indicate the variation of the two quantities from each other.

Another object is to provide a single dial carrying a circular scale, means for converting the variations of one dimension in a piece from the master into change of fluid pressure, a pointer movable on said scale in response to said pressure variation, means for converting the variations of a second dimension into change of fluid pressure, a second pointer movable on said scale in response to said second pressure variation, and means carried by one pointer to indicate the difference in extent of variation of the two dimensions.

Another object of the invention is to provide a pointer carrying two sub-pointers adapted to be set at any desired angle to the main pointer.

Another object of the invention is to provide a pointer supported on a shaft carrying two sub-pointers pivoted on the same shaft and each carrying a gear segment, and means for inserting a pinion into the main pointer to engage the gear segment of a particular sub-pointer to set that sub-pointer at any desired angle to the main pointer.

One embodiment of the invention is illustrated by Figures 1–6 of the accompanying drawing.

Figure 1:
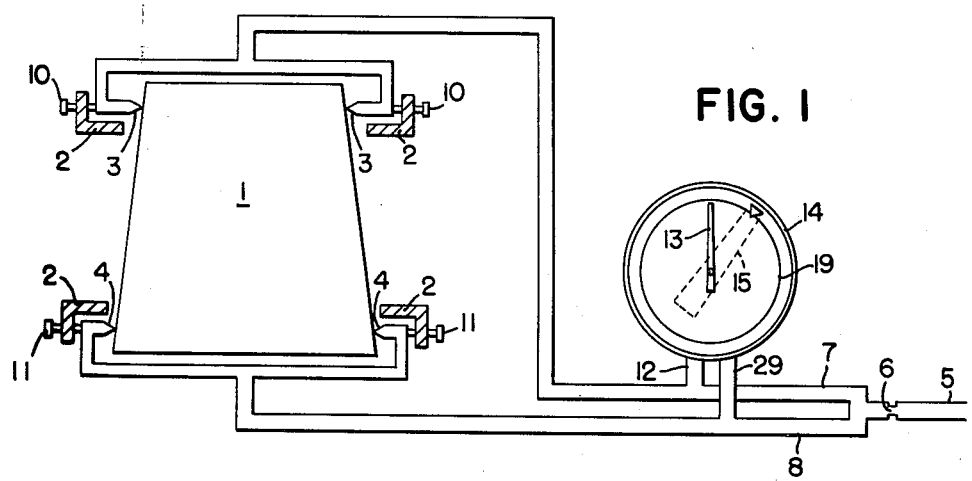
Fig. 1 shows a gauging system, illustrating my invention.

Fig. 1 shows a tapered piece 1 being tested for the accuracy of the taper. On stationary supports 2 are mounted two pairs of jets 3 and 4. Air under constant pressure is supplied through line 5 and a constriction 6 and is divided into two portions, one going through line 7, the other through line 8. As can be seen, the line 7 leads to the jets 3 and line 8 leads to jets 4. These jets can be laterally adjusted by means of adjusting screws 10 and 11 in the supports 2.

Figure 3:
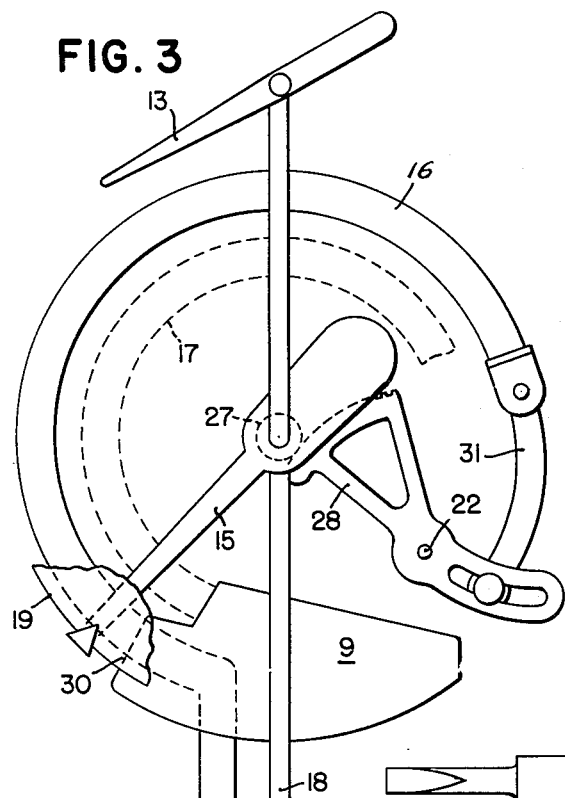
Fig. 3 is an exploded diagrammatic representation of the special gauge which includes the two pointers that indicate the variation of the taper from the standard and also the variation in size of the specimen.

The variation in the diameter of the tapered piece 1 at jets 3 will vary the pressure in line 7 and through line 12 will cause a pointer 15 in the gauge housing 14 to move in proportion to the variation in pressure in line 7. Fig. 3 shows the details of this more fully and a fuller description will be made later. In like manner a variation of the diameter at jets 4 will cause a pointer 13 concentric with pointer 15 to move.

The pointer 15 is behind the dial plate 19 and the end of this pointer is bent over the dial plate so that the two pointers 13 and 15 will not interfere with each other.

Figure 4:
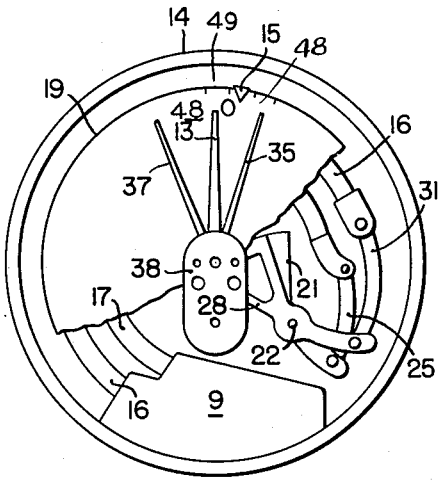
Fig. 4 shows a front view of the gauge with the pointer shown in Fig. 2 in place.

In Fig. 3 an exploded view shows how the two pointers are actuated. This is done by means of two Bourdon tubes 16 and 17 which are in the same plane, but one of which is smaller than the other as shown in Fig. 4.

Taking up first the method of actuation of pointer 13, this pointer is carried by a shaft 18 moved by a pinion 20 at its lower end. The pointer 15 turns freely on shaft 18 and is independently driven. The pinion 20 meshes with the sector 21 which is pivoted on a stud 22 which may be carried by the housing. The sector end 23 is pivotally attached at 24 to a link 25 which is in turn attached at 26 to the end of the Bourdon tube 17. A variation in pressure in line 8 will thus move pointer 13. This Bourdon tube is supported in abutment 9 and a passage therein connects with 29 which branches off 8.

The pointer 15 is actuated by a similar apparatus consisting of pinion 27 meshing with sector 28 which may be supported on a stud 22 carried by the housing. Sector 28 is attached to a link 31 which is attached to the end of Bourdon tube 16. This Bourdon tube is also carried by abutment 9 and connects with lines 12 and 7. A variation in pressure in line 7 will move pointer 15.

While the two tubes have been shown for clarity as one above the other in the exploded view Fig. 3, they are actually nested within each other with tube 17, the smaller one, being inside 16. The two sectors 21 and 28 are of course in different planes. The dial plate 19 is supported at 30 on the abutment 9.

Figure 2:
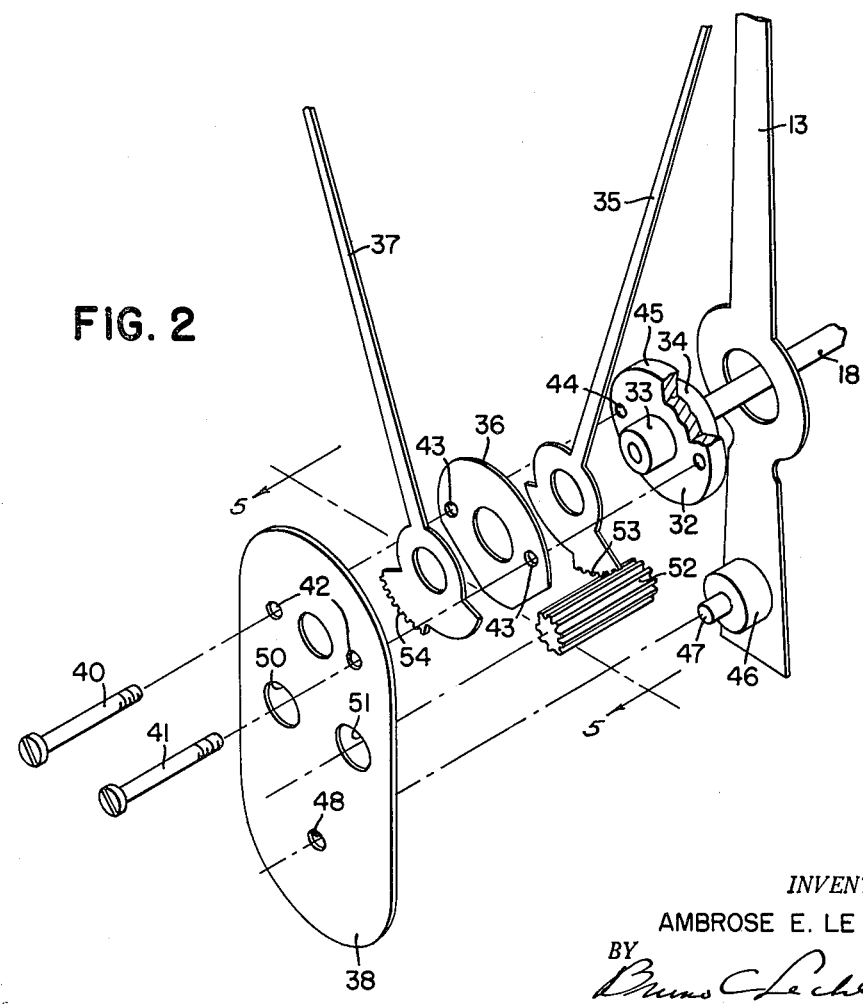
Fig. 2 shows a special pointer with adjustably limit pointers in isometric view with the parts in exploded relation.
Figure 5:
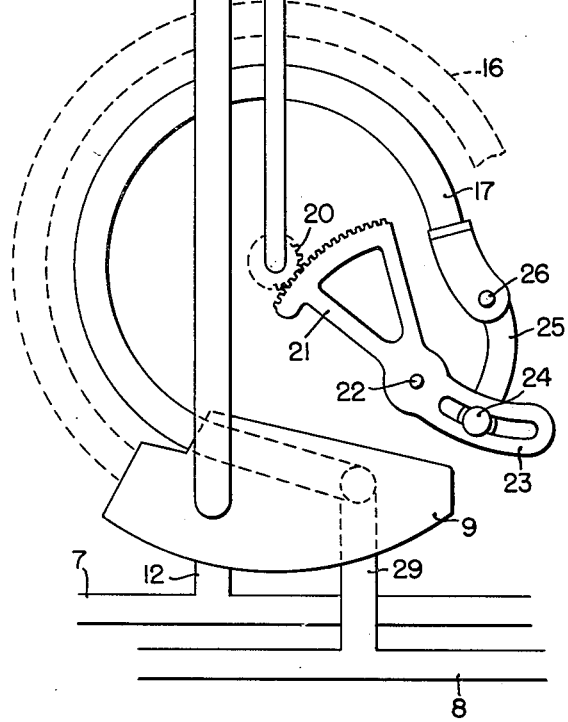
Fig. 5 is a back view of the front plate and the front limit pointer taken along line 5—5 of Fig. 2.
Figure 5:
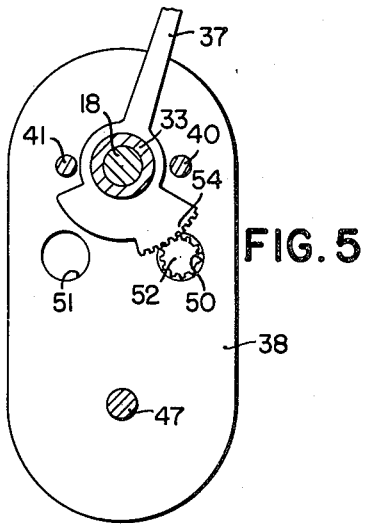

Since such apparatus is frequently used as a go-no-go gauge, it is convenient to substitute for the pointer 13 shown in Fig. 3, the special limit pointer shown in Figs. 2, 4, 5.

The pointer 13 in this device is not a single pointer as in Fig. 3, but is made up of several parts shown in perspective in Fig. 2. The upper end of shaft 18 carries integral therewith a special collar 32 having two projecting bushings 33 and 34. The pointer 13 is placed over bushing 34 and then the bushing is staked over so that the pointer and the bushing act as an integral unit. The bushing 33 serves as a shaft upon which the limit pointer 35, a spacer 36 and the limit pointer 37 are loosely mounted. A plate 38 is also mounted on the bushing 33, and is attached firmly to the collar 32 by means of two screws 40 and 41 which extend through holes 42 in plate 38, holes 43 in spacer 36 and screw into threaded holes 44 in a flange 45 of collar 32. To add further rigidity to the assembly a spacer 46 is attached to the lower end of pointer 13 and a projection 47 is adapted to pass through a hole 48 in plate 38 and then be riveted over after the assembly is complete. The screws 40 and 41 are drawn up so that the friction between parts located between pointer 13 and plate 38 is sufficient to hold the limit pointer in any selected position until readjusted.

Figure 6:
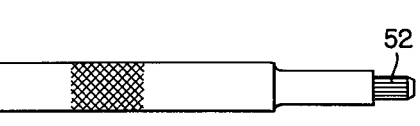
Fig. 6 is a view of a tool, shown at half the scale of Fig. 2, used in adjusting the sub-pointers of Fig. 2.

The method of adjustment is by means of the tool shown in Fig. 6. This tool is adapted to be inserted through holes 50 and 51 in plate 38. The end 52 of the tool is cut as a pinion which meshes with either the gear teeth on extension 53 of pointer 35 or the gear teeth on extension 54 on pointer 37. By turning the tool first in one hole and then the other the position of the limit pointers can be varied.

In using the apparatus the master tapered piece is put into the apparatus as shown at 1 in Fig. 1. The two pointers 13 and 15 will point in different directions depending upon the distance the air jets 3 and 4 are from the specimen. One or the other of these air jet points is now adjusted by turning either the screw 10 or 11. In so doing the distance between that set of air jets and the specimen is either increased or decreased and this will be reflected in the position of the one pointer.

Preferably both sets of air jets are adjusted until both the pointers 13 and 15 are in line with the zero mark 49 on the fixed scale 48 on dial plate 19.

It is then decided what tolerance is permissible either above or under the standard figures. The pointer 35 is now set to the point on the scale 48 which measures the allowable oversize of the piece. This is done by inserting the pinion 52 attached to the tool shown in Fig. 6 in the hole 50 to engage the gear segment 54. The other pointer 37 is similarly set by inserting the tool shown in Fig. 6 in the hole 51 so that the pinion 52 will engage the gear segment 54 of pointer 37.

The master piece 1 is now removed and one of the pieces to be tested is put in its place. Both the pointers 15 and 13 will move. The pointer 13 will indicate, by reference to the scale 48, whether the piece is oversized or undersized at its large end. The pointer 15 will similarly indicate, in relation to scale 48, whether the small end of the piece is oversized or undersized.

In many cases we are only interested in the taper and if the tapered piece is not placed in precisely the same position as the master both the pointers 13 and 15 will be off, as shown in Fig. 4, from the zero position. In that case, if the pointer 15 is between the sub-pointers 35 and 37, the piece will be within the allowed limits as regards taper.

What I claim is:

1. In a device for measuring two diameters of a tapered piece simultaneously; the combination comprising a casing, a dial mounted in the casing, a pressure responsive means, a pointer actuated by said means and passing over said dial, a second pressure responsive means, a second pointer actuated by said second means and concentric with the first pointer passing over the same dial, adjustable limit pointers connected to one of said pointers and movable therewith, an air supply line having a restricted portion therein, two branches beyond said restricted portion, an operative connection from each branch to one of said pressure responsive means, a plurality of spaced air jets directed at said tapered piece at the end of each branch, and means for varying the distance between the air jets at the end of at least one branch to adjust one of said pressure actuated pointers to zero position, said adjustable limit pointers cooperating with the pressure actuated pointer movable relative thereto so as to show if the piece is within the desired taper limits.

2. In a device for indicating the variations of two spaced dimensions on a piece and also the relation between the variation in said one dimension to the variation in said other dimension; the combination comprising two fluid supply lines having a common regulable source of fluid pressure, spaced means adjacent said piece and connected to said supply lines for converting the variations in said dimensions to variations in the pressures of said supply lines, pressure responsive means located in each supply line, a pair of concentrically mounted pointers, one of said pointers being actuated by one of said pressure responsive means and the other of said pointers being actuated by the other of said pressure responsive means, scale means associated with said pointers, means for adjusting at least one of said pressure actuated pointers to a zero scale position, and adjustable spaced limit pointers carried by one of said pressure actuated pointers and movable therewith, said limit pointers cooperating with the pressure actuated pointer movable relative thereto to indicate the said relation between the variations in each of the said dimensions.

3. In a taper gauge, or the like, for measuring a piece the combination comprising a source of fluid under pressure, a pair of pipes, a single restriction between said source and said pair of pipes, a pair of spaced air jets, each of said pipes being connected to one of said jets, said jets being adapted for mounting adjacent spaced points of the piece for varying the amount of fluid emitting from the jet as a function of the proximity of said jets to the piece so as to vary the fluid pressure in said pipes, a pair of Bourdon tubes, one tube being connected to one of said pipes after said restriction and the other tube being connected to the other of said pipes after said restriction, a pair of pointers, one pointer being operatively connected to one of said tubes and the other pointer being operatively connected to the other of said tubes, concentric shaft mounting means for said pointers, a single dial for said pointers, and an adjustable tolerance indicator pointer assembly operatively connected with one of said pointers, said assembly having two additional tolerance indicator pointers, said tolerance indicator pointers cooperating with the other pointer in indicating tolerance limits.

References Cited in the file of this patent

UNITED STATES PATENTS

| Number | Name | Date |
|---|---|---|
| 1,960,241 | Deerwester | May 29, 1934 |
| 2,112,704 | Mackay | Mar. 29, 1938 |
| 2,457,401 | Ripley | Dec. 28, 1948 |
| 2,500,558 | Maxwell | Mar. 14, 1950 |
| 2,513,374 | Stead et al. | July 4, 1950 |
| 2,532,974 | Warner | Dec. 5, 1950 |
| 2,551,471 | Snow | May 1, 1951 |
| 2,572,368 | Minx | Oct. 23, 1951 |
| 2,573,843 | Hendrix et al. | Nov. 6, 1951 |